March 8, 1966 J. L. HENKES, JR 3,239,841

MEDIUM FOR COMBINED THERMOPLASTIC AND MAGNETIC RECORDING

Filed Oct. 16, 1962 4 Sheets-Sheet 1

Inventor:
John L. Henkes, Jr.

by John P. DeWitt
His Attorney.

Inventor:
John L. Henkes, Jr.
by John P. DeWitt
His Attorney.

MEDIUM FOR COMBINED THERMOPLASTIC AND MAGNETIC RECORDING

Filed Oct. 16, 1962

Inventor:
John L. Henkes, Jr.

by John P. DeWitt
His Attorney.

Inventor:
John L. Henkes, Jr.
by John P. Dellitt
His Attorney.

3,239,841

MEDIUM FOR COMBINED THERMOPLASTIC AND MAGNETIC RECORDING

John L. Henkes, Jr., Loudonville, N.Y., assignor to General Electric Company, a corporation of New York Filed Oct. 16, 1962, Ser. No. 230,970
7 Claims. (Cl. 346—74)

Figure 1:
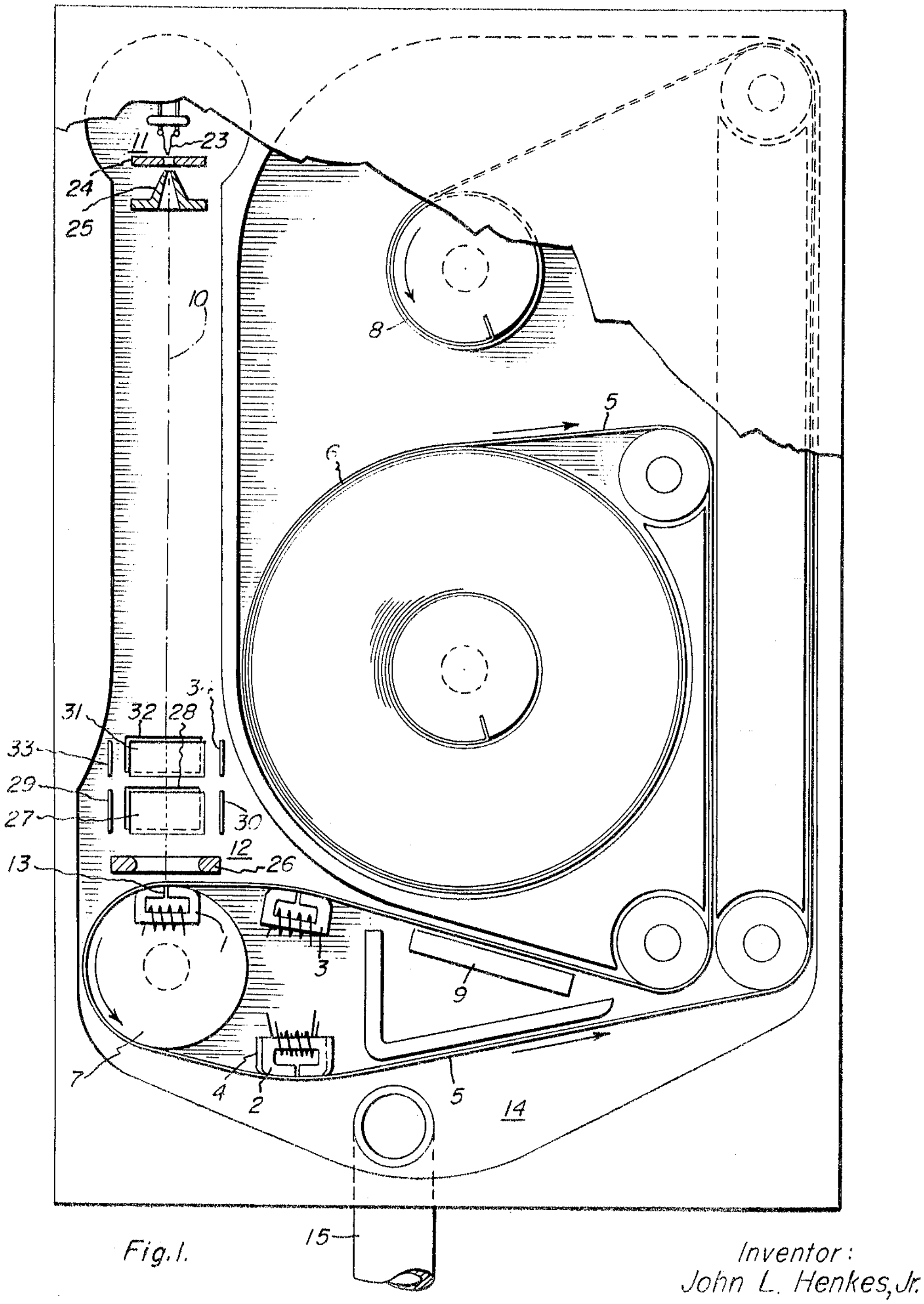

This invention relates to a medium and system for providing electrostatic deformation image recording and magnetically recorded information on the same medium in synchronization with the electrostatic deformation images.

In the copending application of William E. Glenn, Jr., Serial No. 8,842, now patent 3,113,179, there is described and claimed a method and apparatus for recording information on a recording medium including a thermoplastic recording surface. In accordance with one embodiment there illustrated, information is "inscribed" on this surface with an electron beam which may form a television raster of deposited charge having a distribution across the thermoplastic surface corresponding to the information. The thermoplastic, in a heated condition, is drawn at charged locations towards a conductive layer on the back of the thermoplastic layer to establish physical undulations in the thermoplastic in the form of thickness deformations. These undulations are capable of deflecting light to reproduce the information so recorded. Where density of charge deposited by the electron beam is the greatest, the depth of deformation is greater, producing greater light output in the reproducing apparatus.

A television raster scan produced by the electron beam is composed of a number of separate raster sweeps or lines. This raster itself can be employed directly to produce the lines of an electrostatic deformation pattern, resulting in thickness deformations corresponding to the raster lines. Information recorded in this manner on the tape may be projected in an optical system including a source of light and a masking system, positioned to intercept nondeflected light, whereby only intelligence from the deformation pattern on the tape passes through the tape and masking system to form a projected image on a screen. Alternatively, smaller portions of the pattern can be read out as with a flying spot scanner and photocell arrangement, or by a television camera tube.

In recording television information and the like it is frequently desirable to record the audio or other related information on the same recording medium or tape. It is possible to place an audio-containing sound track in the form of a separate deformation pattern along one edge of the thermoplastic layer. However, the width of this adjacent track subtracts from the space available for the picture information contained on the principal recording and therefore detracts from the information-packing density possible in the principal recording area of tape. Sound can be recorded in a very narrow track but the bandwidth and signal-to-noise ratio does not improve as the sound track is made narrower. Moreover, if a single electron beam or the like is employed for writing the principally recorded information, and for writing the sound as well, the bandwidth and signal-to-noise ratio is further decreased. It would additionally be desirable to provide several auxiliary recording tracks for the recording of stereo sound and the like or for recording a picture synchronization signal. However, a plurality of separate tracks on the thermoplastic recording layer so reduces the principal recording track as to render their inclusion impractical.

It is accordingly an object of the present invention to provide one or more high-quality recording tracks on a thermoplastic recording tape without subtracting from the recording area available for the principally recorded information or subtracting from the time available for an electron beam to write the principally recorded information.

In accordance with one aspect of the present invention, a magnetizable material is included in the recording medium preferably in the form of a plurality of magnetic recording tracks on the reverse side of the recording medium from the thermoplastic surface. An optically reflective and electrically conductive layer, which may also comprise a magnetizable layer, is disposed under the thermoplastic layer whereby the information contained in the thermoplastic recording is read out using reflected light rather than light transmitted through the tape. Thus, an illuminating source or flying spot scanner may act to direct light on the thermoplastic recording surface where the light is deflected by the lines of thickness deformation in the thermoplastic material. The light is reflected by the reflecting layer onto a viewing system or the like through an intermediate bar system for intercepting non-deflected light.

The reverse side of the medium is not adaptable for carrying a second layer of thermoplastic material because this side is the only surface left for contacting drive capstans and the like, used for transporting the thermoplastic bearing medium. If this surface were recorded using conventional thermoplastic material, the drive mechanism would produce marring and scratching of the thermoplastic material and it would therefore result in low quality optical reproduction. Moreover independent heating and cooling of both sides of the tape, attendant to simultaneous thermoplastic recording, would become very cumbersome. For these reasons, the reverse side is not used for thermoplastic recording. Several magnetic channels are, however, easily accommodated on the tape on the reverse side, and are useable to perform several important functions. For example, one or two tracks may record high-quality sound or stereo sound, a third track desirably contains synchronizing signals or locating signals and a fourth track can be used for editorial notes, cueing directions, foreign language sound, or many other desirable purposes. A principal advantage of this recording arrangement is the substantial increase in recorded information carried on a single recording medium. Another principal advantage and important utility of the present invention resides in making possible the indexing of mass information stored as the deformation recordings in the thermoplastic material. A given "frame" of thermoplastically recorded material is rapidly located via the magnetic synchronizing track after which it may be "read out" optically.

Figure 2A:
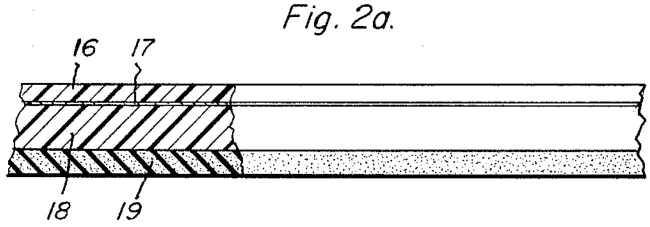
Figure 2B:
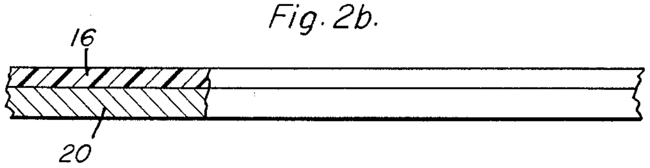
Figure 2C:
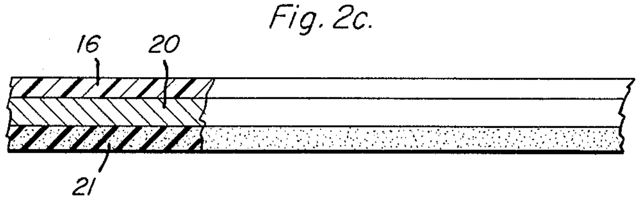
Figure 2D:
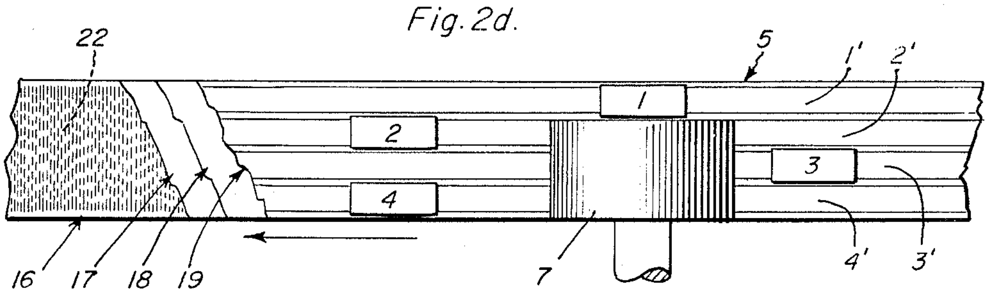
Figure 3:
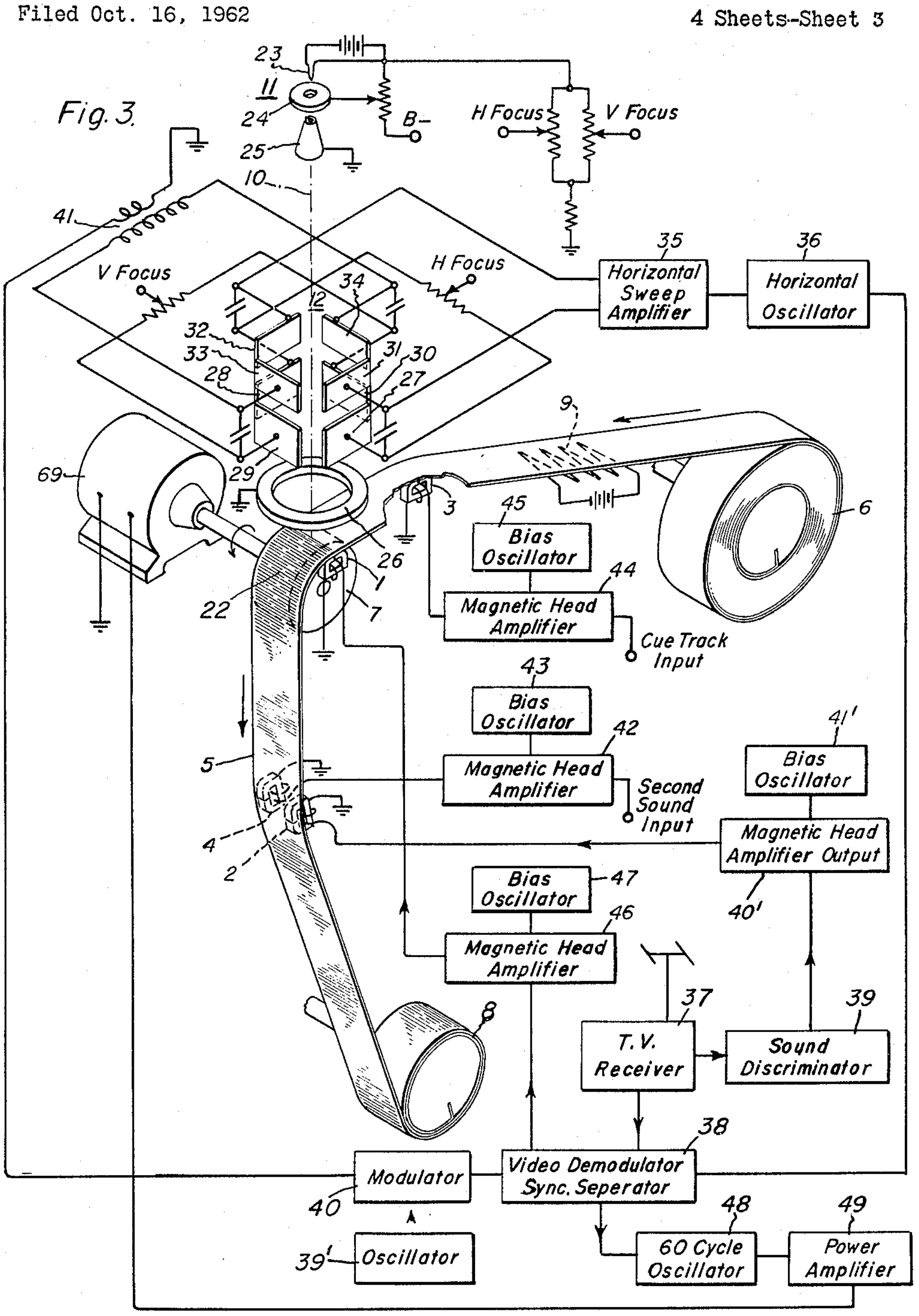
Figure 4:
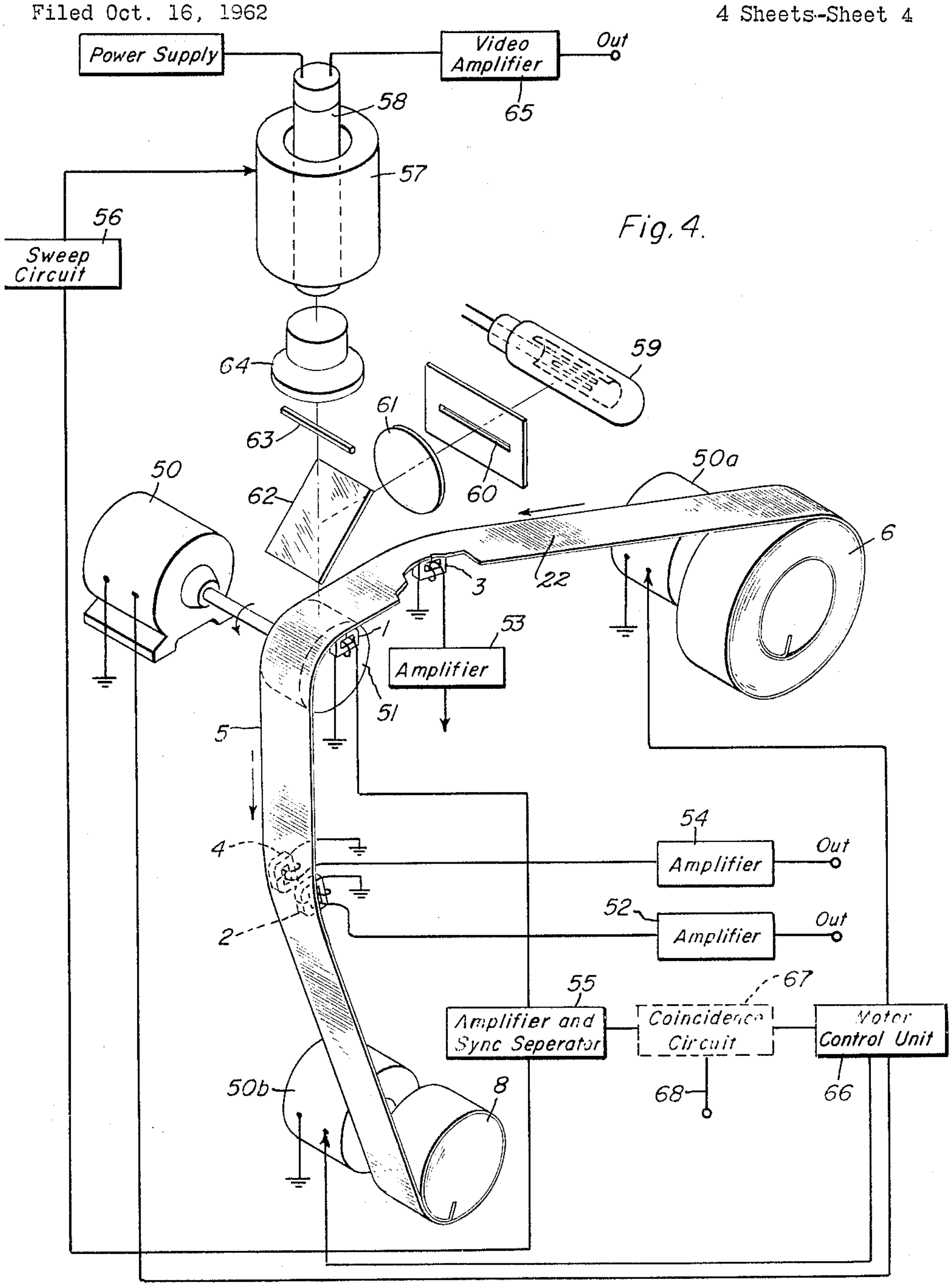

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 illustrates a recording system in accordance with the present invention,

FIG. 2*a* is an enlarged cross-sectional view of thermoplastic and magnetic recording tape in accordance with the present invention, FIG. 2*b* is an enlarged cross-sectional view of a thermoplastic and magnetic recording tape according to one modification of the present invention, FIG. 2*c* is an enlarged cross-sectional view of a thermoplastic and magnetic recording tape according to another modification of the present invention, FIG. 2*d* is a view of one side of a recording tape according to the present invention showing four magnetic recording tracks, FIG. 3 is a simplified schematic drawing of a recording circuit in accordance with the present invention, and FIG. 4 is a simplified schematic diagram of a readout system in accordance with the present invention.

In accordance with an illustrated embodiment of the present invention, an electrostatically recordable medium includes magnetizable material in the form of one or more tracks responsive to one or more magnetic recording heads. Parallel magnetic tracks are preferably located on the reverse side of the recording medium from the electrostatic recording surface. The recording system of the present invention is shown in FIG. 1 and is illustrated in greater schematic detail in FIG. 3.

Referring to FIG. 1, a plurality of magnetic recording heads 1, 2, 3 and 4 are positioned relative to a moving recording medium or tape 5 for producing parallel magnetic recordings on one side of the medium 5. The medium 5, which is driven off a supply reel 6 by drive capstan 7 and wound up on a takeup reel 8, has a surface on the tape opposite from the magnetic tracks which is electrostatically deformable as set forth in the aforementioned copending application of William E. Glenn, Jr., Serial No. 8,842, now Patent No. 3,113,179, and is generally a thermoplastic material. It also includes a conductive layer under the deformable surface. As the tape moves past a heating element 9, the thermoplastic material is heated to a softened condition. Then electron beam 10 generated by an electron gun 11 establishes a charge pattern upon the thermoplastic surface of tape 5 where it passes over capstan 7, and this charge pattern causes deformation undulations in the thermoplastic material as the charged areas are drawn toward the conductive layer. The interior of the recording chamber 14 is evacuated through a conduit 15 by pump means (not shown) to facilitate the formation and deflection of electron beam 10.

In accordance with the illustrated embodiment, the electron beam 10 is repeatedly deflected across the tape so that as the tape moves longitudinally a series of deformation lines are formed across the tape capable of deflecting light later presented thereto. Groups of lines may appropriately comprise television rasters or the like.

As the electrostatic information is recorded, magnetic information is simultaneously recorded on the opposite side of medium 5 in synchronization with the electrostatic information. Magnetic recording heads 1–4 are disposed along the tape for this purpose and are laterally displaced from one another. One magnetic head, designated by reference numeral 1, is desirably located with its magnetic recording gap 13 directly opposite the scan of electron beam 10; in this manner the synchronization signal is recorded with head 1 which directly corresponds to an undulation deformation produced by beam 10, in a manner hereinafter more fully described. Other magnetically recorded information conveniently comprises one or more sound tracks capable of high quality or stereo sound reproduction and a track for cueing or direction information or foreign language sound accompanying a television recording. It is understood that four sound tracks are shown by way of illustrative example only and that a greater or lesser number may be employed as suitable for the information to be recorded.

Referring to FIGS. 2*a*–2*d*, a recording medium or tape in accordance with the present invention is illustrated in several embodiments thereof. In FIG. 2*a*, a particular embodiment of the tape shown in exaggerated cross-section, includes a top thermoplastic layer 16. This thermosplastic layer may conveniently comprise a blend of polystyrene, m-terephenyl and a copolymer of 95 weight percent butadiene and 5 weight percent styrene. Specifically the composition may be 70 percent polystyrene, 28 percent terephenyl and 2 percent of the copolymer. Under the thermoplastic layer is situated an optically smooth thin metal layer 17 and may comprise aluminum. This layer reflects light presented thereto through the thermoplastic layer. It also functions as a ground plane for attracting electrostatically charged areas of the thermoplastic material in the electrostatic recording process to establish the deformations in the thermoplastic layer. On the back of the aluminum layer is secured a suitably strong flexible plastic layer 18. A suitable material therefor is Mylar or Cronar comprising polyethylene terephthalate. This layer carries magnetically recordable layer 19, suitably latex as a binder for iron oxide ($Fe_3O_4$) which receives recorded information.

FIG. 2*b* is an enlarged cross-section of a recording medium in accordance with the present invention wherein a metal layer 20 performs the functions of reflecting light through the thermoplastic layer 16 and providing the conductive backing for attracting electric charges deposited by the electron beam, and in addition constitutes the magnetically recordable material. This metal also imparts physical properties to the recording medium of strength and durability.

A variation of the tape medium is illustrated in FIG. 2*c* where a steel layer 20 again provides the light reflective conductive layer. In this embodiment an iron-oxide-containing latex layer 21 adhering to the stainless steel enhances the magnetic recording properties of the medium.

FIG. 2*d* is an enlarged and partially cutaway view of the recording medium in accordance with the present invention showing four magnetic tracks disposed on one surface thereof. These tracks are conveniently iron-oxide in a latex binder as shown at 19 in the FIG. 2*a* cross-section, and are designated by reference numerals 1′, 2′, 3′, and 4′ corresponding to the recording heads 1–4 in FIG. 1. These recording heads as well as capstan 7 are again illustrated in FIG. 2*d* in their relative positions along the recording medium. Reference numeral 22 designates raster lines recorded upon thermoplastic layer 16 forming the opposite surface of the tape.

An exemplary tape medium conveniently has a width of 8 mm. including a 7 mm. wide electrostatic recording on the thermoplastic leaving a 0.5 mm. unrecorded portion along each edge. The magnetic tracks 1′, 2′, 3′ and 4′ are conveniently 1.8 mm. in width with an approximately 0.2 mm. guard band between tracks. The tape medium travels at a speed of 12.4″ per second or 315 mm. per second during recording and playback of the electrostatically recorded information.

The electrostatically recorded information may comprise successive television frames, each frame constituting at 262.5 line raster, it being understood the television information is continuously recorded without interlacing. Each 262.5 line raster occupies approximately 5.25 mm. along the length of the tape and is immediately adjacent the preceding raster. The raster lines as recorded in the thermoplastic medium in the form of deformations are capable of selectively deflecting light presented thereto for the purpose of reproducing the original image. It is understood this specific example is for the purpose of illustration only but by no means illustrates the ultimate in packing density of electrostatically recorded information on the medium.

FIG. 3 schematically illustrates recording and synchronization circuitry of the FIG. 1 recording apparatus in accordance with the present invention. In this figure, the configuration of tape travel through the recording apparatus is shown in developmental or partially straightened form for ease of illustration. In FIG. 3 the electron gun 11 comprises a filament 23, a grid electrode 24, and an anode electrode 25, which act to form electron beam 10. The electron beam then passes through deflecting and focusing system 12. The deflecting and focusing system comprises two sets of four electrostatic deflection plates spaced along beam 10 near the recording medium and a grounded circular electrode 26 between the last set of plates and the recording medium. The set closest to the circular electrode including plates numbered 27, 28, 29 and 30 is maintained at a moderately high negative voltage with respect to circular electrode 26 and establishes an electrostatic field with respect to circular electrode 26. This field acts to focus electron beam 10 in the two orthogonal directions to a point upon tape 5.

The second set of plates, 31, 32, 33 and 34, capacitively coupled to the corresponding members of the first set, also promotes focusing while acting to deflect the electron beam. As capacitive coupling exists between the two sets of plates, plates 27, 28, 29 and 30 also aid in deflecting the electron beam. Plates 31 and 32 are driven by horizontal sweep amplifier 35 which receives a sawtooth wave from horizontal oscillator 36. The electron beam is thereby caused to trace a succession of lines across the tape in synchronization with oscillator 36. The focus and deflection electrode system and the energizing circuit therefor is not my invention, but is a prior invention of William E. Glenn, Jr., and is described and claimed in copending application Serial No. 335,117, filed January 2, 1964, and assigned to the assignee of this application.

The video information to be electrostatically recorded, as well as attendant synchronizing signals, are conveniently derived from a television receiver 37 which includes a video demodulator and sync separator 38, and a sound discriminator 39. The synch separator portion provides a triggering signal for the aforementioned horizontal oscillator 36, whereby the horizontal traces of the electron beam 10 are properly synchronized with the incoming video information. In the FIG. 3 apparatus, a motor 69 acts to rotate the drive capstan 7 driving the tape 5, and this drive should also be synchronized. Since the same power source operating at the same frequency is not always available, it is desirable to electrically drive the motor from a 60 cycle oscillator, 48, synchronized with the aforementioned video information so that proper tape speed and vertical raster registration in readout may take place. The signal from oscillator 48, synchronized from video demodulator and sync separator 38, is amplified by power amplifier 49, for electrically driving motor 69 at the proper recording speed.

The video output from video demodulator 38 modulates a very high frequency signal, originating at oscillator 39′, in a modulator 40. This high frequency signal, and including the signal modulation, is applied to deflection plates 33 and 34 through transformer 41. The frequency of oscillator 39′ is arranged to be quite high in comparison to the frequency of horizontal oscillator 36 so the coupling thereof to the deflection plates has the effect of decreasing the density of charge deposited by electron beam 10. When the signal reaching these plates from oscillator 39′ has its maximum strength, the electron beam will be wobbled to a maximum extent in a direction longitudinal of tape 5 and therefore will in effect produce a relatively broad electrostatic image on tape 5 during the trace of a raster line. Since the electrostatic image is therefore not highly concentrated, the resulting deformation in the thermoplastic recording medium is small. The high frequency wobbling of the electron beam decreases the density of the deposited charge on the tape and therefore decreases the depth of the deformation resulting therefrom. The deformation of decreased depth will then deflect less light in the readout apparatus, subsequently to be described. It is noted a positive image will thereby result from the conventional television signal.

However, when the minimum signal from oscillator 39′ reaches the deflection plates, the electrostatic image on the tape is more concentrated and results in a deeper deformation capable of diffracting light to a greater degree. The video is thus produced as the deformation recording on the tape 5, charge density and depth of deformation being inversely proportional to the amplitiude of the oscillator video signal.

As the video is recorded on the tape, the corresponding sound from sound discriminator 39, appropriately amplified by magnetic head amplifier 40′ and including appropriate A.C. bias from bias oscillator 41′, is applied to magnetic sound recording head 2, thereby providing sound information on the tape in substantial synchronism with the video information.

Although track dimensions of those given in the foregoing example provide for very high quality audio recording, additional bandwidth and signal-to-noise ratio may be secured by employing two simultaneous tracks for sound. Likewise stereo sound reproduction can be achieved using a pair of tracks. The sound input for the additional track may be applied to magnetic head amplifier 42 which drives magnetic recording head 4 in conjunction with an appropriate bias from bias oscillator 43. Another signal may be applied to the tape via magnetic head amplifier 44 operated in conjunction with bias oscillator 45, driving magnetic head 3. This track may be used for directing cues, foreign language dubbing, or other useful purposes.

According to an important feature of the present invention, a synchronizing signal is applied to a magnetic head for example magnetic head 1 via a magnetic head amplifier 46 employed in conjunction with bias oscillator 47. As heretofore mentioned, head 1 is desirably located in juxtaposition with the electrostatic recording electron beam but on the opposite side of the tape, whereby the optimum registration of the synchronizing signal is achieved. In this way, head 1 can establish accurate synchronization with the deformation recording without being affected by flexure, stretch or thickness variations produced in tape 5. In the FIG. 3 embodiment, the synchronizing input to magnetic head amplifier 46 is the vertical and horizontal synchronization signals derived from the video demodulator and sync separator of the television receiver, and are later used in reproducing the images recorded. It is understood that television raster information is recorded in the foregoing example for illustrative purposes. Information, pictorial or otherwise, may be recorded on the thermoplastic surface with a high recording density and synchronized with an appropriate synchronization signal recorded in juxtaposition therewith. For example, a large body of information such as an encyclopedia can be pictorially recorded along the thermoplastic surface and the synchronization signal may represent page numbers, book numbers or subject indicia employed for locating information in the electrostatic recording, instead of or in addition to individual line synchronization information. Other types of rasters of recording formations may be used.

FIG. 4 illustrates an example readout apparatus employed in accordance with the present invention. This apparatus is similar in construction to the arrangement illustrated in FIGS. 1 and 3. In the FIG. 4 embodiment, a motor 50 rotating a drive capstan 51 acts to propel tape medium 5 past magnetic read heads 1, 2, 3 and 4 employed for reading tracks 1′, 2′, 3′, and 4′ (shown in FIG. 2), as well as past an optical readout station. Information from tracks 2′, 3′ and 4′ as read by heads 2, 3 and 4 are conveniently amplified with amplifier means 52, 53 and 54. Synchronizing information on track 1′ as read by magnetic head 1 is amplified and detected in sync separator 55.

A vidicon camera tube 58 is conveniently employed in the optical readout station. When television information is recorded and the synchronizing information comprises horizontal and vertical television sync pulses, a usual television receiver type of sync separator is adapted to provide an output for the horizontal sweep circuit indicated at 56.

The sweep circuit in turn drives the horizontal deflection winding of focusing and deflecting yoke 57, surrounding vidicon camera tube 58 employed in the optical readout station.

The electrostatically recorded information is read out at the optical readout station including a light source 59 and a narrow slit 60, a lens 61, and a half-silvered mirror 62, disposed to direct light from light source 59 on the electrostatically recorded side of tape medium 5. Slit 60 is quite narrow constituting a line light source and is imaged by lens 61 along an individual line or deformation as disposed transversely on the recording medium. If no light is deflected, i.e. in the absence of a deformation line, the light will be simply reflected by the reflecting surface immediately under the thermoplastic layer to fall upon a narrow bar 63 which has the same configuration as slit 60. However, providing the light is deflected by an information-containing deformation, it will pass around bar 63 and an image of the grating line will be formed by lens system 64 upon the vidicon tube 58. The vidicon tube is registered to trace along each deformation line to reproduce this information as a video signal which is then amplified by video amplifier 65. It is noted an increase in deformation depth produces a greater vidicon signal resulting in a positive video signal. It is of course understood the information electrostatically recorded in thermoplastic may be read out or viewed frame-by-frame, in the manner described in the aforementioned copending application of William E. Glenn, Jr., Serial No. 8,842, now patent 3,113,179, as well as in William E. Glenn, Jr., Re. Patent 25,169. Pictorial or frame read out for conveniently viewing the information can be provided after the correct information has been located on the tape.

The vertical sync signal from amplifier and sync separator 55 is presented to a motor control unit 66 similar to that indicated in the FIG. 3 apparatus for the purpose of moving the tape medium 5 at the correct speed.

Coincidence circuit 67 may be interposed, between sync separator and the motor control unit, for receiving a coincidence input at 68 and comparing it with an index that is to be located on track 1 on the tape. For example, it may be desired to locate particular pictorial information recorded on the tape. For this purpose the motor control unit 66 is arranged to energize motor 50 for driving the tape at high speed until a coincidence halts such high speed translation of the tape. For this purpose auxiliary motors 50*a* and 50*b* are driven simultaneously with motor 50. When the correct area of the tape is located, the tape is slowed to read out the desired electrostatically recorded information. High speed tape drives providing rapid acceleration and deceleration of tape material are well known by those skilled in the art and hence need not be described in detail here.

It is evident from the foregoing that information synchronized with thermoplastic deformation recorded information is provided on the same medium without in any way sacrificing the space available for the deformation recording itself. Moreover, synchronizing information is provided in this manner for locating deformation recorded information and for operating readout equipment therefor.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A recording medium comprising an elongated tape having a first surface with thermoplastic material adapted to form deformations in response to an electrostatically recorded charge pattern and heat sufficient for at least softening the thermoplastic material, and an optically smooth reflecting layer on the underside of said thermoplastic material opposite from said deformations and substantially across the transverse dimension of said medium, said layer having the property of being magnetizable in response to an information-bearing magnetic field.

2. A recording medium comprising an elongated tape having a first surface including thermoplastic material adapted to form deformations in response to an electrostatically recorded charge pattern and heat sufficient for at least softening the thermoplastic material, and an optically smooth reflecting layer on the underside of said thermoplastic material opposite from said deformations and substantially across the transverse dimensions of said tape, said optically smooth layer being formed of magnetizable material for receiving magnetically recorded information.

3. The recording medium according to claim 2 wherein said optically smooth and magnetizable layer is magnetizable stainless steel.

4. A recording medium comprising an elongated tape having a first surface including thermoplastic material adapted to form deformations in response to an electrostatically recorded charge pattern and heat sufficient for at least softening the thermoplastic material, a supporting layer of material, a conducting and optically smooth metallic layer between said supporting layer and said thermoplastic layer which is capable of uniformly reflecting visible light presented thereto for visibly reproducing said charge pattern, and a magnetizable layer on the side of said supporting layer opposite said thermoplastic material and substantially across the transverse dimension of said medium.

5. A recording medium comprising an elongated tape having a first surface of thermoplastic material adapted to form deformations in response to an electrostatically recorded charge pattern and heat sufficient for at least softening the thermoplastic material for reproducing images in the visible spectrum upon the presentation of visible light thereto, a plastic supporting layer for said thermoplastic material, a conducting and optically smooth metallic layer between said supporting layer and said thermoplastic layer which is capable of uniformly reflecting visible light presented thereto, and a surface layer on the remote side of said tape from said themoplastic material and substantially across the transverse dimension of the tape, said layer comprising magnetizable material and a binder therefore.

6. The recording medium according to claim 5 wherein said magnetizable material is iron oxide and said binder is latex.

7. A recording medium comprising an elongated tape having a first surface with thermoplastic material adapted to form deformations in response to an electrostatically recorded charge pattern and with sufficient heat for at least softening the thermoplastic material for reproducing images in the visible spectrum upon the presentation of visible light thereto, an optically reflective layer under said surface of thermoplastic material and a tape layer opposite said first surface and substantially across the transverse dimension of said medium including magnetically responsive material for receiving magnetically recorded information which is synchronized with said electrostatically recorded information.

References Cited by the Examiner

UNITED STATES PATENTS

| | | | |
|---|---|---|---|
| 2,950,971 | 8/1960 | Lewin | 179—100.2 |
| 2,985,866 | 5/1961 | Norton | 340—173 |
| 3,171,106 | 2/1965 | Lemmond | 340—174.1 |

IRVING L. SRAGOW, *Primary Examiner.*

F. C. WEISS, A. I. NEUSTADT, *Assistant Examiners.*